Figure 1:
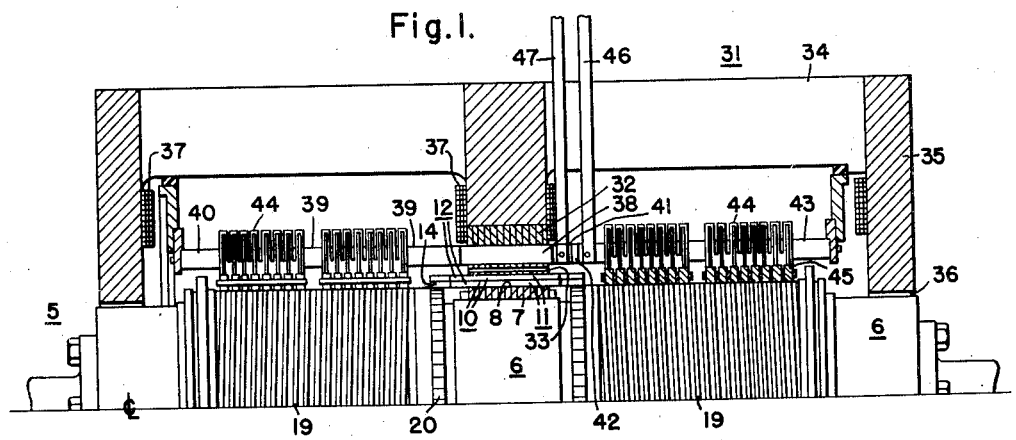

March 21, 1950     G. P. LESSMANN     2,501,344
UNIPOLAR GENERATOR COLLECTOR-NECK CONNECTIONS
Filed Oct. 12, 1948

WITNESSES:
Edward Michaels
Nw. L. Groome

INVENTOR
Gerhard P. Lessmann.
BY O.B. Buchanan
ATTORNEY

Patented Mar. 21, 1950

2,501,344

UNITED STATES PATENT OFFICE 2,501,344

UNIPOLAR GENERATOR COLLECTOR-NECK CONNECTIONS

Gerhard P. Lessmann, Pittsburgh, Pa., assignor to Westinghouse Electric Corporation, East Pittsburgh, Pa., a corporation of Pennsylvania Application October 12, 1948, Serial No. 54,107

9 Claims. (Cl. 171—212)

My invention relates to large unipolar generators, and to the armature end-turn connections thereof. More particularly, my invention relates to improvements in unipolar generators of the type shown in the Hague et al. Patent 2,134,511, granted October 25, 1938, and still more particularly it relates to improvements in the collector-neck connections shown in the Matthews Patent 2,094,365, granted September 29, 1937.

The Matthews patent was aimed at the solution of difficulties encountered in soldering the ends of the armature half-coils to the necks of the massive, solid current-collector cylinders at the two ends of the machine. Because of the massive nature of the current-collector cylinders, these cylinders had such a tremendously high heat-conductivity that it was very difficult to heat any one spot, which was to be soldered to a coil-end, without heating all the rest of the entire cylinder, including any soldered joints which had already been made thereto. Matthews alleviated this difficulty by making the soldered end-turn collector-neck connections in closely spaced groups of three, and providing an extra open slot, for heat-insulation, between successive groups of three soldered connections, on the necks of the massive current-collector cylinders. In this way, Matthews reduced the flow of heat from the joints which were being soldered at any instant, enough so that the soldering operation could be performed; but experience has shown that this soldering job was unsatisfactory, because the solder would not flow as expected, so that it was found that practically all of the armature-coils had very little soldered connection to the current-collector cylinders.

The object of my present invention is to provide an improved solderless connection between the necks of the massive current-collector cylinders and the ends of the armature-coils of unipolar generators.

More specifically, it is an object of my invention to provide a collector-neck connection using radially milled slots in the collector-connection, for receiving the ends of the armature half-coils, each of these neck-slots having one or more enlarged portions therein, such as might be formed by drilling a hole, larger than the slot, radially through the slot, the ends of the armature half-coils being provided with radially perforated enlarged portions fitting in these slot-enlargements, and having tapered pins driven thereinto, to make a tight contact, after which a peripheral banding-means is applied over the tapered pins, for holding the assembly in place.

Figure 2:
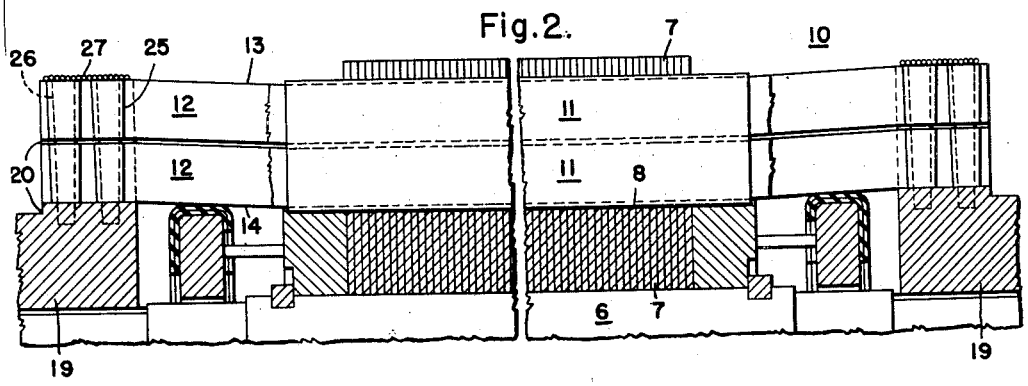
Figure 3:
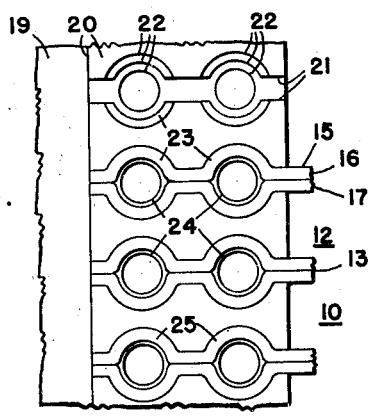

With the foregoing and other objects in view, my invention consists in the structures, systems, combinations, parts, and methods of design and assembly, hereinafter described and claimed, and illustrated in the accompanying drawing, wherein Figure 1 is a longitudinal sectional view of the top half of a unipolar generator of the type to which my invention is applicable;

Fig. 2 is a fragmentary longitudinal sectional view illustrating the manner in which the conductor-ends of the armature are secured to the slotted necks of the respective collector-cylinders at the two ends of the machine, with the pins and the banding removed, and Fig. 3 is a developed plan view of one of the collector-necks, illustrating the manner in which the neck-connections are made, the banding-wire being omitted.

As shown in Fig. 1, my invention is illustrated as being embodied in a unipolar generator having a rotor member 5, comprising a shaft 6 of magnetizable material, on which is mounted an intermediately disposed armature-core 7 which is provided with a plurality of peripheral conductor-receiving slots 8, which are at least partially open, and which receive a plurality of armature-conductors or inductors 10, which are preferably in the form of preformed half-coils made of strap-conductors. These armature-conductors or half-coils 10 have central portions 11 which lie in the armature-slots 8, and bent end-turns 12 which may be of any desired design. The illustrated end-turn design is more particularly described and claimed in a copending application of E. H. Myers, Serial No. 47,805, filed September 4, 1948, and assigned to the Westinghouse Electric Corporation.

In the illustrated form of embodiment of my invention, six armature-conductors or half-turns are placed in each of the armature-slots 8, with one or more conductors placed in the top of the slot, as indicated at 13, and a like number of conductors placed in the bottom of the slot, as indicated at 14. Each of the top-conductors 13, and also each of the bottom conductors 14, is of a stranded construction, so arranged that the terminal ends 15 of each of the conductors is divided into two halves 16 and 17, which are of special construction, as shown in Fig. 3, as will be subsequently described.

Mounted on the shaft 6 at each end of the rotor-core, is a long, massive, solid collector-cylinder 19, which is a heavy casting made of a highly-conducting alloy and usually spirally grooved on its current-collecting surface. The armature-end of each collector-cylinder 19 is provided with an upstanding flange or neck 20, to which the ends of the respective armature-conductors 13 and 14 are connected.

In accordance with my invention, the neck-connections are made by first milling substantially radial end-connection slots 21, cut into the periphery of the neck 20, so as to extend deep enough, into the neck, to accommodate a conductor-end of one top conductor 13 and one bottom conductor 14. Each end-connection slot 21 has at least one, and preferably two, tapered enlarging holes 22 drilled radially thereinto, these holes being larger than the slot-width and being centered with respect to the slot, so as to provide slot-enlargements where these holes are located.

The terminal ends 15 of the armature-conductors 13 and 14 fit into these end-connection slots 21, and each terminal conductor-end 15 has at least one, and preferably two, taperedly enlarged portions 23 which are radially and taperedly perforated, as shown at 24, these enlarged portions 23 fitting the holes 22 in the end-connection slots 21. Preferably, the enlarged portions 23 of the terminal conductor-ends 15 are provided by preforming the two halves 16 and 17 of these ends so that they have registering half-loops 25 which fit within the holes or enlargements 22 of the slots 21, and which form the substantially radial perforations 24 in the terminal-ends 15.

In accordance with my invention, the two halves 16 and 17 of each of the terminal conductor-ends 15 are tightened in their end-connection slots 21 in the collector-neck 20 by means of tapered pins 26 which are driven through the holes 24 which are provided by the half-loops 25, the bottom ends of the pins 26 preferably passing on into the solid body-portion of the current-collecting cylinder 19 under the end-connection slots 21. These tapered pins 26 may be either threaded or plain.

Disposed peripherally around the flange or neck 20 of each of the two collector-cylinders 19, in position to extend peripherally over the top ends of the several tapered pins 26, is a tightly wound banding-wire 27 (Fig. 2) for positively safeguarding against any loosening of the pins 26 or any centrifugal movement of the terminal conductor-ends 15.

The unipolar generator further comprises a stator member 31 which is provided with a slotted stator core or yoke 32 surrounding the rotor-core 7 and spaced therefrom by a cylindrical or annular air-gap 33. The outer periphery of the stator-core 32 is connected, at each end, to a stator-frame member consisting of a plurality of frame-arms 34 extending axially towards the respective ends of the machine, and terminating, at each end of the machine, in an end-bracket 35 which completes the magnetic circuit to a point 36 in the shaft 6 outside of the respective collector-cylinders 19. The magnetic circuit just described produces a unidirectional field in the cylindrical air-gap 33, the flux being maintained by field-windings 37.

Disposed in the slots of the stator-core 32, and preferably slightly insulated therefrom, as by insulation 38, are a plurality of circumferentially spaced, axially extending bars 39 constituting a compensating winding lying in the pole-face of the stator-member. The compensating bars 39 have long ends 40 at their left-hand ends, extending axially, in spaced relation, over the collector-cylinder 19 at the rear end of the machine, to provide brushholder-supporting bars 40 at that end of the machine. The compensating bars 39 have short ends 41, terminating close to the stator-core 32, at the front end of the machine, and these short ends 41 are connected, by insulating joints 42, to a plurality of separate brushholder-supporting bars 43 which comprise, in effect, insulated extensions of the several compensating bars 38, at the front end of the machine. These separate front-end brushholder-supporting bars 43 extend axially, in spaced relation, over the collector-cylinder 19 at their end of the machine.

As set forth in the Hague et al. patent, the brushholder-supporting bars 40 and 43 are used to support a large number of brushholders 44, which are closely spaced, both axially and circumferentially, for supporting a large number of compactly mounted brushes 45 bearing on the respective collector-cylinders 19 at the respective ends of the machine.

Current is conducted to or from the separate or insulated brushholder-supporting bars 43 at the front end of the machine, and from or to the short ends 41 of the compensating bars 39 at the same end of the machine, by means of a large number of generator-leads 46 or 47, respectively, as shown in Fig. 1.

By means of my invention, I provide tight current-carrying contact-joints between the two halves 16 and 17 of each conductor-end 15 of the armature-winding and the sides of the end-connection slots 21 in the collector-necks 20, with as much contact-surface, and as much pressure, as would ordinarily be put on a bolted joint which was designed to carry the same heavy current.

In order to insure oxidation-free contact-surfaces, the conductor-ends 15 are preferably silver-plated, in accordance with a usual contact-practice.

While I have illustrated and described my invention in but a single form of embodiment, which seems to be preferable, it is obvious that many changes may be made, by way of additions, omissions, or the substitution of equivalents, without departing from the essential spirit of my invention. I desire, therefore, that the appended claims shall be accorded the broadest construction consistent with their language.

I claim as my invention:

1. A dynamo-electric machine characterized by a rotor member having a rotor-core provided with a plurality of peripheral conductor-receiving core-slots, a solid cylindrical current-conducting member at at least one end of said rotor-core, said cylindrical current-conducting member having a plurality of end-connection slots extending approximately radially therein, an annular portion of said cylindrical current-conducting member which is not provided with such end-connection slots, a plurality of rotor-winding conductor-bars lying in said core-slots and having ends lying in said end-connection slots of said cylindrical current-conducting member or members, approximately radially extending tapered wedging-means for tightening the individual bar-ends in the several end-connection slots, and peripheral banding-means extending over said wedging-means for holding the same in place.

2. A dynamo-electric machine characterized by a rotor member having a rotor-core provided with a plurality of peripheral conductor-receiving core-slots, a solid cylindrical current-conducting member at at least one end of said rotor-core, said cylindrical current-conducting member having a plurality of end-connection slots extending approximately radially therein, an annular portion of said cylindrical current-conducting member which is not provided with such end-connection slots, said end-connection slots having holes, larger than the slots, extending substantially centrally, and approximately radially, through the slots, a plurality of rotor-winding conductor-bars lying in said core-slots and having ends lying in said end-connection slots of said cylindrical current-conducting member or members, said bar-ends having enlarged portions fitting in the holes in the end-connection slots, said enlarged portions of the bar-ends having approximately radially extending holes therethrough, and a plurality of tapered pins extending through said bar-end holes.

3. A dynamo-electric machine characterized by a rotor member having a rotor-core provided with a plurality of peripheral conductor-receiving core-slots, a solid cylindrical current-conducting member at at least one end of said rotor-core, said cylindrical current-conducting member having a plurality of end-connection slots extending approximately radially into the periphery thereof but not extending radially inwardly as far as the bore of the cylindrical current-conducting member, said end-connection slots having holes, larger than the slots, extending substantially centrally, and approximately radially, through the slots, a plurality of rotor-winding conductor-bars lying in said core-slots and having ends lying in said end-connection slots of said cylindrical current-conducting member or members, said bar-ends having enlarged portions fitting in the holes in the end-connection slots, said enlarged portions of the bar-ends having approximately radially extending holes therethrough, and a plurality of tapered pins extending through said bar-end holes and on into the unslotted annular portion of the cylindrical current-conducting member underneath said end-connecting slots.

4. A dynamo-electric machine characterized by a rotor member having a rotor-core provided with a plurality of peripheral conductor-receiving core-slots, a solid cylindrical current-conducting member at at least one end of said rotor-core, said cylindrical current-conducting member having a plurality of end-connection slots extending approximately radially therein, an annular portion of said cylindrical current-conducting member which is not provided with such end-connection slots, said end-connection slots having holes, larger than the slots, extending substantially centrally, and approximately radially, through the slots, a plurality of stranded rotor-winding conductor-bars lying in said core-slots and having ends lying in said end-connection slots of said cylindrical current-conducting member or members, the stranded bar-construction including bar-ends which are divided into two circumferentially adjacent halves having preformed half-loops fitting in said holes in the end-connection slots, and a plurality of tapered pins extending through said half-loops, for tightening said half-loops in place.

5. A dynamo-electric machine characterized by a rotor member having an armature-core provided with a plurality of peripheral conductor-receiving core-slots, a current-collecting member at at least one end of said armature-core, said current-collecting member having one or more end-connection slots extending approximately radially into the periphery thereof at the armature-end thereof, said end-connection slot or slots having one or more holes larger than the slot, extending substantially centrally, and approximately radially, through the slot, an armature-winding carried by the armature-slots and having one or more terminal-ends lying in said end-connection slot or slots, said terminal-end or ends having an enlarged portion or portions fitting in the hole or holes in the end-connection slot or slots, said enlarged portion or portions having an approximately radially extending hole therethrough, and a tapered pin or pins extending through said hole or holes for tightening said enlarged portion or portions in place.

6. A dynamo-electric machine characterized by a rotor member having an armature-core provided with a plurality of peripheral conductor-receiving core-slots, a current-collecting member at at least one end of said armature-core, said current-collecting member having one or more end-connection slots extending approximately radially into the periphery thereof at the armature-end thereof, said end-connection slot or slots having one or more holes larger than the slot, extending substantially centrally, and approximately radially, through the slot, an armature-winding carried by the armature slots and having one or more terminal-ends lying in said end-connection slot or slots, said terminal-end or ends having an enlarged portion or portions fitting in the hole or holes in the end-connection slot or slots, said enlarged portion or portions having an approximately radially extending hole therethrough, and a tapered pin or pins extending through said hole or holes and on into the solid body-portion of the current-collector member under the peripheral slot or slots therein for tightening said enlarged portion or portions in place.

7. A dynamo-electric machine characterized by a rotor member having an armature-core provided with a plurality of peripheral conductor-receiving core-slots, a current-collecting member at at least one end of said armature-core, said current-collecting member having one or more end-connection slots extending approximately radially into the periphery thereof at the armature-end thereof, said end-connection slot or slots having one or more holes larger than the slot, extending substantially centrally, and approximately radially, through the slot, a stranded-conductor armature-winding carried by the armature-slots and having one or more terminal-ends lying in said end-connection slot or slots, the stranded-conductor construction of said end-connection or connections being divided into two circumferentially adjacent halves having preformed half-loops fitting in said hole or holes, and a tapered pin or pins extending through said half-loops for tightening said half-loops in place.

8. A unipolar dynamo-electric machine characterized by a rotor member having an armature-core provided with a plurality of peripheral conductor-receiving core-slots which are at least partially open, a solid cylindrical current-collecting member at each end of said armature-core, each cylindrical current-collecting member having a plurality of peripheral end-connection slots extending approximately radially into the periphery thereof at the armature-end thereof, said end-connection slots having holes, larger than the slots, extending substantially centrally, and approximately radially, through the slots, preformed half-turn armature-coils having their central portions lying in said core-slots and having their ends lying in said end-connected slots, said coil-ends having enlarged portions fitting in the holes in the end-connection slots, said enlarged portions having approximately radially extending holes therethrough, and a plurality of tapered pins extending through said holes, for tightening said enlarged portions in place.

9. A unipolar dynamo-electric machine characterized by a rotor member having an armature-core provided with a plurality of peripheral conductor-receiving core-slots which are at least partially open, a solid cylindrical current-collecting member at each end of said armature-core, each cylindrical current-collecting member having a plurality of peripheral end-connection slots extending approximately radially into the periphery thereof at the armature-end thereof, said end-connection slots having holes, larger than the slots, extending substantially centrally, and approximately radially, through the slots, preformed half-turn armature-coils of stranded construction having their central portions lying in said core-slots and having their ends lying in said end-connection slots, the stranded coil-construction including coil-ends which are divided into two circumferentially adjacent halves having preformed half-loops fitting in said holes, a plurality of tapered pins extending through said half-loops, and a banding-means over said pins to hold them in place.

GERHARD P. LESSMANN.

REFERENCES CITED

The following references are of record in the file of this patent:

UNITED STATES PATENTS

| Number | Name | Date |
|---|---|---|
| 550,407 | Dice | Nov. 26, 1895 |
| 1,445,885 | Hix | Feb. 20, 1923 |
| 1,513,355 | Ward | Oct. 28, 1924 |
| 2,134,511 | Hague | Oct. 25, 1938 |